(12) United States Patent
Pixton et al.

(10) Patent No.: US 6,187,848 B1
(45) Date of Patent: Feb. 13, 2001

(54) GLASS FILLED POLYESTER COMPOSITIONS WITH IMPROVED COLOR STABILITY

(75) Inventors: Matthew R. Pixton; Robert R. Gallucci, both of Mt. Vernon, IN (US); James M. Finan, Downing Town, PA (US)

(73) Assignee: General Electric Company, Schenectady, NY (US)

(*) Notice: Under 35 U.S.C. 154(b), the term of this patent shall be extended for 0 days.

(21) Appl. No.: 09/026,579

(22) Filed: Feb. 20, 1998

(51) Int. Cl.$^7$ .................................................. C08K 5/53
(52) U.S. Cl. ..................... 524/126; 524/128; 524/147; 524/303; 524/417; 524/494; 524/605
(58) Field of Search ..................... 524/126, 128, 524/147, 303, 151, 153, 494, 417, 604, 605

(56) References Cited

U.S. PATENT DOCUMENTS

| | | | |
|---|---|---|---|
| 2,465,319 | 3/1949 | Whinfield et al. . | |
| 3,047,539 | 7/1962 | Pengilly . | |
| 3,378,516 | * 4/1968 | Tholstrup et al. | 524/302 |
| 3,428,598 | * 2/1969 | Matsubayashi et al. | 524/302 |
| 3,459,787 | * 8/1969 | Weesner | 260/481 |
| 3,671,487 | 6/1972 | Abolins . | |
| 3,758,549 | * 9/1973 | Dexter et al. | 260/481 |
| 4,075,163 | 2/1978 | Hofer et al. . | |
| 4,122,061 | 10/1978 | Holub et al. . | |
| 4,474,914 | * 10/1984 | Spivack | 524/126 |
| 4,564,658 | 1/1986 | Liu . | |
| 4,636,544 | 1/1987 | Hepp . | |
| 4,753,994 | 6/1988 | Carter, Jr. et al. . | |
| 4,972,015 | * 11/1990 | Carico et al. | 524/303 |
| 5,055,606 | 10/1991 | Fisch et al. . | |
| 5,057,622 | 10/1991 | Chisholm et al. . | |
| 5,102,696 | 4/1992 | Pan et al. . | |
| 5,258,422 | * 11/1993 | Chang | 524/126 |
| 5,346,767 | * 9/1994 | Tilley et al. | 428/412 |
| 5,371,123 | 12/1994 | Gallucci et al. . | |
| 5,441,997 | 8/1995 | Walsh et al. . | |
| 5,510,398 | * 4/1996 | Clark et al. | 524/147 |
| 5,521,230 | 5/1996 | Bhatia et al. . | |
| 5,589,530 | 12/1996 | Walsh . | |
| 5,601,679 | * 2/1997 | Mulcahy et al. | 524/147 |
| 5,674,928 | * 10/1997 | Chisholm et al. | 524/147 |
| 5,674,931 | * 10/1997 | Gallagher et al. | 524/414 |
| 5,840,798 | * 11/1998 | Vollenberg et al. | 524/423 |
| 5,852,084 | * 12/1998 | Neri et al. | 524/126 |

OTHER PUBLICATIONS

Plastics Additive Handbook, R. Gachter & H. Muller, Hanser–Gardner 1996, p92–95.
Principles of Color Technology, F.W. Billmeyer & M. Saltzman/John Wiley & Sons, 1966.

* cited by examiner

*Primary Examiner*—Veronica P. Hoke

(57) ABSTRACT

A polyester molding composition reinforced with fiber glass or other silica based filler which has color stability at relatively high temperatures and comprises (a) from 40 to 97 weight percent of a polyester resin; (b) from about 3 to about 60 weight percent fibrous glass or silica based filler or mixture; (c) less than about 5 percent by weight additional ingredients which include a combination of stabilizers consisting essentially of an acidic quencher, a thioester and a phosphonite and (d) optionally from 2 to 30 weight percent of a flame retarding composition.

28 Claims, No Drawings

GLASS FILLED POLYESTER COMPOSITIONS WITH IMPROVED COLOR STABILITY

FIELD OF THE INVENTION

This invention relates to glass fiber filled polyester molding compositions with reduced discoloration on thermal aging.

BACKGROUND OF THE INVENTION

Moldable glass filled crystalline resin blends offer a high degree of surface hardness, solvent resistance, strength, stiffness, heat resistance, good appearance and colorability. However, polyester formulations typically begin to discolor within days on continuous exposure, in air, to temperatures exceeding about 120° C. The presence of flame retardant additives can cause additional issues to color stability as seen in U.S. Pat. No. 5,371,123 where interaction of certain brominated FR agents and certain glass coatings gave rise to undesirable color.

Hindered phenol antioxidants and phosphites have been used to improve the retention of mechanical properties in polyesters as described in the "Plastics Additives Handbook" R, Gachter and H. Muller, Hanser-Gardner 1996, p92–95. Various additives have been used to improve the retention of polyester viscosity and molecular weigh in the melt. U.S. Pat. No. 5,589,530 to Walsh describes blends of low and high molecular weight polybutylene terephthalate which are melt stabilized by the addition of certain phosphorus-containing compounds. Other additives are described as UV stabilizers, pigments, colorants, fillers, plasticizers, processing aids, antioxidants and the like. Addition of zinc phosphate, sodium acid pyrophosphate, hindered phenols, and pentaerythritol tetrastearate are specifically set forth.

Despite all this work light colored polyester formulations tend to discolor over time, especially when subjected to temperatures exceeding about 120 degrees Centigrade. This discoloration is especially noticeable in polyesters that have white or light color pigmentation. The thermal aging results in a color shift which renders the polyester undesirable for applications such as oven handles or trim, and other appliances subject to heat such as toasters, broilers, dryers, hair styling devices and especially clothing irons. Hence, it is desirable to provide improved polyester resins having desirable properties of strength, stiffness, resistance to deformation at high temperature, as well as good color stability over time when subjected to relatively high temperatures.

SUMMARY OF THE INVENTION

The compositions of the present invention provide for enhanced color stability without undesirable affecting the physical and chemical properties of the polyester resin.

According to the present invention, there is provided a lightly colored, reinforced polyester molding composition having color stability at relatively high temperatures, comprising (a) from 40 to 97 weight percent of a polyester resin; (b) from about 3 to about 60 weight percent silica based filler or fiber (c) and less than about 5 percent by weight additional ingredients which include a combination of stabilizers consisting essentially of an acidic phosphorus quencher, a thioester and a phosphonite. The blend may optionally have from 2 to 30 weight percent of a flame retarding composition (d). Preferred flame retardants are polymeric aromatic bromine compounds with an antimony oxide synergist Surprisingly, the above combination of acidic quencher, thioester and phosphonite and absent other stabilizers such as hindered phenols, gives enhanced retention of original color on thermal aging.

Addition of polyolefins to polyesters has beneficial effects as described in Holub et.al., U.S. Pat No. 4,122,061, which describes polyester reinforced blends of poly(1,4-butylene terephthalate) and poly(ethylene terephthalate) impact modified with the addition of a polyolefin or olefin based copolymer resin, and in Liu, U.S. Pat. No. 4,564,658, which describes PBT with linear low density polyethylene. We have found that the presence of these polyolefin resins in the blends of this invention is detrimental, accelerating color formation even in the presence of phosphorus and sulfur based additives that are usually beneficial to polyolefin stabilization.

Thus polyester compositions of the prior art tend to undergo undesirable discoloration. This is surprising in view of the fact that hindered phenols are used as stabilizers for polyolefins and their synergy with phosphorus and sulfur based antioxidants is a basic tenet of polymer stabilization. The compositions of the present invention are characterized by the absence of a significant amount of a polyolefin and the use of thioester, phosphonite and acidic quencher combinations as stabilizers.

DESCRIPTION OF THE PREFERRED EMBODIMENTS

The reinforced polyester molding composition includes the following major ingredients which are described as follows: thermoplastic polyester resins, silica based fillers or fibers, especially glass fibers, and mixtures of phosphonite, thioester and acidic quenchers. In the preferred composition flame retardant additives are also employed.

Polyester components include crystalline polyesters such as polyesters derived from aliphatic or cycloaliphatic diols, or mixtures thereof, containing from 2 to about 10 carbon atoms and at least one aromatic dicarboxylic acid. Preferred polyesters are derived from an aliphatic diol and an aromatic dicarboxylic acid having repeating units of the following general formula:

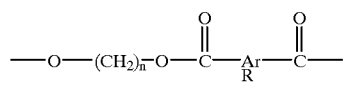

wherein n is an integer of from 2 to 6. Ar is a $C_6$–$C_{20}$ aryl radical comprising a decarboxylated residue derived from an aromatic dicarboxylic acid.

Examples of aromatic dicarboxylic acids represented by the decarboxylated residue Ar are isophthalic or terephthalic acid, 1,2-di(p-carboxyphenyl)ethane, 4,4'-dicarboxydiphenyl ether, 4,4' bisbenzoic acid and mixtures thereof. All of these acids contain at least one aromatic nucleus. Acids containing fused rings can also be present, such as in 1,4- 1,5- or 2,6-naphthalene dicarboxylic acids. The preferred dicarboxylic acids are terephthalic acid, isophthalic acid, naphthalene dicarboxylic acid or mixtures thereof.

The most preferred polyesters are poly(ethylene terephthalate) (PET), and poly(butylene terephthalate) (PBT), poly(ethylene naphthanoate) (PEN), poly(butylene naphthanoate) (PBN), poly(propylene terephthalate) (PPT), poly(cyclohexanedimethylene terephthalate) (PCT) or mixture of these resins.

Also contemplated herein are the above polyesters with minor amounts, e.g., from about 0.5 to about 15 percent by weight, of units derived from aliphatic acids and/or aliphatic polyols to form copolyesters. The aliphatic polyols include glycols, such as poly(ethylene glycol) or poly(butylene glycol). Such polyesters can be made following the teachings of, for example, U.S. Pat. Nos. 2,465,319 and 3,047,539.

The preferred poly(1,4-butylene terephthalate) resin used in this invention is one obtained by polymerizing a glycol component at least 70 mol %, preferably at least 80 mol %, of which consists of tetramethylene glycol and an acid component at least 70 mol %, preferably at least 80 mol %, of which consists of terephthalic acid, and polyester-forming derivatives therefore.

The polyesters used herein have an intrinsic viscosity of from about 0.4 to about 2.0 dl/gm. measured in a 60:40 phenol/tetrachloroethane mixture or similar solvent at 23–30° C. VALOX Registered TM 315 polyester is particularly suitable for this invention. Preferably intrinsic viscosity is about 1.1 to about 1.4 dl/gm.

Blends of polyesters may also be employed in the composition. Preferred polyesters blends contain poly(ethylene terephthalate) and poly(1,4-butylene terephthalate). When blends of these preferred components are employed the polyester resin component can comprise from about 5 to about 50 parts by weight poly(ethylene terephthalate) and from about 95 to about 50 part by weight poly(1,4-butylene terephthalate) based on 100 parts by weight of both components combined.

Also, blends of relatively low molecular weight polybutylene terephthalate resin may be used with a relatively high molecular weight polybutylene terephthalate as set forth in U.S. Pat. No. 5,589,530 to Walsh. The low molecular weight polybutylene terephthalate is a PBT resin having a melt viscosity of less than 600 poise at 250° C.

The silica/glass based filler/fiber comprises from 3 to 60 weight percent, preferably from about 10 to about 35 weight percent based on the total weight of the resin composition. The glass fiber is desirably employed as reinforcement in the present compositions. Glass that is relatively soda free is preferred. Fibrous glass filaments comprised of lime-alumino-borosilicate glass which is known as "E" glass is preferred. The filaments are made by standard processes, e.g., by steam or air blowing, flame blowing and mechanical pulling. The preferred filaments for plastic reinforcement are made by mechanical pulling. The filament diameters range from about 3 to 30 microns but this is not critical to the present invention.

In preparing the molding compositions it is convenient to use the fiber glass in the form of chopped strands of from about ⅛" to about ½" long. In articles molded from the compositions on the other hand shorter lengths will be encountered because during compounding considerable fragmentation will occur.

Glass fibers may be treated with a variety of coupling agents to improve adhesion to the resin matrix. Preferred coupling agents are amino, epoxy, amide or mercapto functionalized silanes. Organo metallic coupling agents, for example titanium or zirconium based organo metallic compounds, may also be used.

Other "glass" fillers may be used in alone or in combination with fiber glass. These include; milled glass, flaked glass, ground quartz, precipitated silica, cristobalite and solid or hollow glass beads or spheres.

In many applications it is desirable to add a flame retardant chemical. Both phosphorous and halogen based materials can be used for this purpose. Halogenated compounds, especially aromatic halogenated compounds are preferred.

The amount of flame-retardant additive may be present in an amount at least sufficient to reduce the flammability of the polyester resin, preferably to a UL94 V-0 rating. The amount will vary with the nature of the resin mixture and with the efficiency of the additive. In general, however, the amount of additive will be from 2 to 30 percent by weight based on the weight of resin. A preferred range will be from about 5 to 15 percent.

Typical halogenated aromatic flame-retardants include; tetrabromobisphenol A polycarbonate oligomer, polybromophenyl ethers, brominated polystyrene, brominated BPA polyepoxide, brominated imides, brominated polycarbonate, poly (haloaryl acrylate), poly (haloaryl methacrylate), or mixtures thereof. Poly (haloaryl acrylate) is preferred with the most preferably being poly (pentabromobenzyl acrylate, PBB-PA). PBB-PA has been known for some time, and is a valuable flame-retardant material, useful in a number of synthetic resins. PBB-PA is prepared by the polymerization of pentabromobenzyl acrylate ester (PBB-MA).

Examples of other suitable flame retardants are brominated polystyrenes such as polydibromostyrene and polytribromostyrene, decabromobiphenyl ethane, tetrabromobiphenyl, brominated alpha, omega—alkylene-bis-phthalimides, e.g. N,N'-ethylene-bis-tetrabromophthalimide, oligomeric brominated carbonates, especially carbonates derived from tetrabromobisphenol A, which, if desired, are end-capped with phenoxy radicals. Tetrabromobisphenol can also be reacted through its glycidyl ether derivative to form epoxy or phenoxy resins which are useful as flame retardant additives. Other aromatic carbonate flame retardants are set forth in U.S. Pat. No. 4,636,544 to Hepp.

The flame retardants are typically used with a synergist, particularly inorganic antimony compounds. Such compounds are widely available or can be made in known ways. Typical, inorganic synergist compounds include $Sb_2O_5$, $SbS_3$ and the like. Especially preferred is antimony trioxide ($Sb_2O_3$). Synergists such as antimony oxides, are typically used at about 0.5 to 15 percent, and more preferably from 1 to 6 percent by weight based on the weight percent of resin in the final composition.

Other ingredients employed in low amounts, typically less than 5 percent by weight of the total composition, include drip reducing agents, lubricants, mold release agents, colorants, and nucleants. The final composition may contain fluoropolymer type resins, like poly tetrafluoroethylene (PTFE) or copolymers, used to reduce dripping in flame retardant thermoplastics. Such compounds are known to those skilled in the art and include, but are not limited to, various fluorinated polyolefins. Particularly useful is polytetrafluoroethylene (PIFE). See, e.g., Wambach, U.S. Pat. No. 3,671,487. Bhatia, et. al., U.S. Pat. No. 5,521,230; Pan, et. al. U.S. Pat. No. 5,102,696 and Carter, et. al. U.S. Pat. No. 4,753,994 which describe other useful fluoro polymer based antidrip additives.

The stabilizers useful in this invention are used at a level of 0.01–10 weight percent and preferably at a level of from 0.05–2 weight percent based on the total formulation. In accordance with the principles of the present invention, the stabilizer package consists substantially entirely of the combination of a quencher, thioester, and phosphonite. The stabilizer combination of thioester and phosphonite is effective with an additional amount of an acidic quencher. Preferred acidic quenchers include acidic phosphate salts; an acid, alkyl, aryl or mixed phosphite having at least one hydrogen or alkyl group; a Group IB or Group IIB metal phosphate salt; a phosphorus oxo acid, a metal acid pyrophosphate or a mixture thereof. These stabilizers are further described in U.S. Pat. No. 5,441,997 to Walsh in column 6, line 48 to column 7, line 10. It is surprising that these compounds, which are usually employed in polycarbonate/polyester blends, have a stabilizing effect in the polycarbonate free compositions investigated herein. In flame retardant compositions containing antimony oxide synergists it may be preferred to use quenchers that are not reducing agents; for example, acidic metal phosphate salts, metal acid pyrophosphates, phosphoric acids, acidic organo phosphates or zinc phosphate, to avoid color formation thought to occur by antimony oxide reduction.

The thioester stabilizer is the type having a sulfur linkage and a carboxylic acid or ester linkage separated by a divalent alkyl group and comprise the following structures.

wherein R is alkyl and R' is alkyl or hydrogen, preferably alkyl is $C_1$ to $C_{30}$. Such thioestester stabilizers are referred to in U.S. Pat. No. 5,057,622 to Chisholm et al.

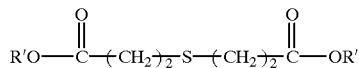

wherein R' is as above, either same or different, and with R' preferably being $C_{12}$–$C_{18}$ alkyl.

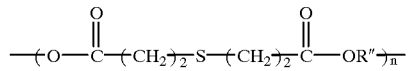

wherein R" is $C_2$–$C_{10}$ diol residue or a polyethylene glycol, polypropylene glycol or polybutylene glycol residue, and n is from 1 to 10.

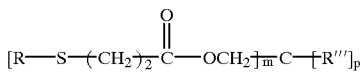

is a most preferred structure with R being alkyl and R'" being alkyl, alkoxy or carboalkoxy, with m+p=4, and most preferably, m=4. Such structures are referred to in U.S. Pat. No. 5,055,606 to Fisch et al.

Thioester/ acid stabilizers typically have molecular weights from about 200 to about 2000. Typical thioester stabilizers are dilauryl thiodipropionate (bis-dodecyl 3,3'-thiodipropionate), disteraryl thiodipropionate (bis-octadecyl 3,3'-thiodipropionate), dimyristyl thiodipropionate, ditridecyl thiodipropionate, mixed esters (lauryl and stearyl) of thiodipropionic acid, and pentaerythritol tetrakis(3-(dodecylthio)propionate). Also preferred thioesters are esters of di-, tri- or tetra- carboxylic acids. Most preferred is pentaerythritol tetrakis(3-(dodecylthio)propionate), which is sold by Witco as Seenox 412-S, due to its good stability, low volatility and low odor.

Preparation of suitable alkyl thio propionic esters is described in U.S. Pat. Nos. 5,055,606 and 5,057,622.

The preferred phosphorus containing stabilizer is a phosphonite wherein one of the P bonds is attached directly to an aryl radical. Examples of such compounds are presented in U.S. Pat. No. 4,075,163. Suitable compounds may be represented by the phosphonite formula:

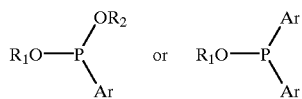

where $R_1$, $R_2$ is alkyl, aryl, alkylaryl, alkyl substituted, preferably an aryl group of 6 to 30 carbon atoms or an alkyl of 1 to 30 carbon atoms, and Ar is an aryl group for example phenyl, naphthyl, biphenyl, terphenyl, etc.

The preferred phosphonites are difunctional containing two phosphonite groups bonded to the aryl group, see formula below:

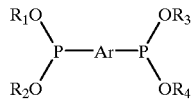

wherein $R_1$, $R_2$, $R_3$, $R_4$ are the same as previously discussed and can be the same or different.

More preferred are aryl phosphonites where R1, R2, R3, R4 are derived from alkylated phenols and the Ar group is derived from biphenyl. Most preferred phosphonite is tetrakis(2,4-di-tert-butylphenyl)4,4'-biphenylene diphosphonite (Sandostab PEPQ from Clariant Chemicals).

The thioester, phosphonite and quenchers can be further combined with tri-aryl phosphite stabilizers of the following formula:

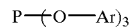

Ar may be as described above with preferred structures including alkylaryl. Commercially available tri-aryl phosphites include tris(nonylphenyl)phosphite, including Weston stabilizer available from GE Specialty Chemicals, and tris (2,4-di-tert-butylphenyl)phosphite available from Ciba-Geigy as Irgafos 168 and as set forth in U.S. Pat. No. 4,187,212.

Generally, Ar is independently chosen from aryl or substituted aryl groups. Aryl groups may be substituted with alkyl, aryl, halogen or ether groups. Alkyl aryl substituted groups are most preferred.

The composition may also contain white pigments like titanium dioxide, zinc sulfide, zinc oxide and lithopone. The pigments may be treated with various additives to aid in dispersion or stability. Preferred pigments are zinc sulfide and titanium dioxide.

Although it is not essential, best results are obtained if the ingredients are precompounded, pelletized and then molded. Precompounding can be carried out in conventional equipment. For example, after predrying the polyester resin, other ingredients, and, optionally, other additives and/or reinforcements, a single screw extruder is fed with a dry blend of the composition, the screw employed having a long transition section to insure proper melting. On the other hand, a twin screw extrusion machine can be fed with resins and additives at the feed port and reinforcement added down stream.

The precompounded composition can be extruded and cut or chopped into molding compounds, such as conventional granules, pellets, etc. by standard techniques.

The compositions can be molded in any equipment conventionally used for thermoplastic compositions. For example, good results will be obtained in an injection molding machine, e.g. of the 80 ton Van Dorn type, with conventional temperatures which depend on the particular thermoplastic utilized. If necessary, depending on the molding properties of the polyester, the amount of additives and/or reinforcing filler and the rate of crystallization of the polyester component, those skilled in the art will be able to make the conventional adjustments in molding cycles to accommodate the composition.

One convenient method of preparing the compositions of the invention comprises blending the resins and other ingredients in powder or granular form, extruding the blend and comminuting into pellets or other suitable shapes. The ingredients are combined in any usual manner, e.g., by dry mixing followed by mixing in the melted state in an extruder, on a heated mill or in other mixers. An alternative method of blending can comprise preparing a preblend of the polyesters and then adding the other ingredients to the preblend. For example, a preblend of the resins and stabilizer can be fed into the upstream port of an extruder with addition of the other ingredients such as glass fibers in a downstream port of the extruder. It is often convenient to precompound the flame retardant materials with a resin prior to a second extrusion adding the stabilizers, polyester and glass or silica filler.

EXAMPLES

The ingredients of the examples shown below in Tables II, III and IV were tumble blended and then extruded on a 2.5 inch HPM Single Screw Extruder with a vacuum vented, double-wave screw, 30:1 L/D, at a barrel and die head temperature between 490 and 510 degrees F and 100 rpm screw speed. The extrudate was cooled through a water bath prior to pelletizing. Test parts were injection molded on a van Dorn molding machine with a set temperature of approximately 500 to 510° F. The pellets were dried for 3–4 hours at 250° F. in a forced air circulating oven prior to injection molding into 0.125 by 2 by 3 inch smooth surface color plaques.

Molded color plaques were heat aged in air in a forced air circulating oven at 180° C. Color chips were removed from the oven at various time intervals and cooled to room temperature. Chip color was measured on a ACS CS-5 ChromoSensor in reflectance mode with a D65 illuminant source, a 10 degree observer, specular component included, CIELAB color scale as described in "Principles of Color Technology" F. W. Billmeyer and M. Saltzman/John Wiley & Sons, 1966. The instrument was calibrated immediately prior to sample analysis against a standard white tile. The color values reported below are the difference before and after heat aging. The color change is expressed as ΔE (delta E).

The control experiments labeled A—H typically showed low/poor color retention. Compared to the control experiments, the examples of the invention, labeled 1–6, containing the stabilizer package containing only combinations of an acidic quencher, thioester, and phosphonite showed improved color retention.

The raw materials comprising the examples below are listed in table I.

TABLE I

| Abbreviation | Name |
|---|---|
| | Raw Materials |
| PBT | poly(1,4-butylene terephthalate) |
| PET | poly(ethylene terephthalate |
| PBB-PA | poly(pentabromobenzyl acrylate) |
| AO | antimony oxide (Sb$_2$O$_3$) |

TABLE I-continued

| Abbreviation | Name |
|---|---|
| | Raw Materials |
| PEPQ | tetrakis(2,4-di-tert-butylphenyl)4,4'-biphenylene diphosphonite sold as Sandostab PEPQ by Clariant Chemicals. |
| 412S | pentaerythritol tetrakis(3-(dodecylthio)propionate) sold as Seenox 412-S by Witco. |
| TSAN | 50/50 blend of PTFE and SAN copolymer |
| PETS | pentaerythritol tetrastearate |
| MCP | monocalcium phosphate |
| MZP | monozinc phosphate |
| EEA | ethylene/ethyl acrylate copolymer |
| EVA | ethylene/vinyl acetate copolymer |
| PE | polyethylene |

Tables II and III illustrate the importance of an acidic quencher in combination with a thioester and a phosphonite to obtain heat aged color stability.

TABLE II

Weight Percent Composition of PBT/PET Blends

| | Samples | | | | |
|---|---|---|---|---|---|
| Component | 1 | 2 | 3 | 4 | A |
| PBT | 45.45 | 45.05 | 45.45 | 45.05 | 45.65 |
| Glass Fiber | 30 | 30 | 30 | 30 | 30 |
| PET | 10 | 10 | 10 | 10 | 10 |
| PBB-PA | 7.28 | 7.28 | 7.28 | 7.28 | 7.28 |
| AO | 3.12 | 3.12 | 3.12 | 3.12 | 3.12 |
| Zinc Sulfide | 3.0 | 3.0 | 3.0 | 3.0 | 3.0 |
| TSAN | 0.50 | 0.50 | 0.50 | 0.50 | 0.50 |
| PEPQ | 0.15 | 0.15 | 0.15 | 0.15 | 0.15 |
| 412S | 0.30 | 0.30 | 0.30 | 0.30 | 0.30 |
| MZP | 0.2 | 0.6 | — | — | — |
| MCP | — | — | 0.2 | 0.6 | — |
| ΔE (180° C., 14 days) | 4.7 | 1.9 | 4.2 | 1.3 | 11.2 |
| ΔE (180° C., 35 days) | 12 | 6.7 | 8.3 | 7.7 | 23 |

TABLE III

Weight Percent Composition of PBT Blends

| | Sample | |
|---|---|---|
| Component | 5 | B |
| PBT | 55.82 | 57.32 |
| Glass Fiber | 30 | 30 |
| PBB-PA | 7.25 | 7.25 |
| AO | 3.06 | 3.06 |
| Zinc Sulfide | 1.5 | 1.5 |
| PETS | 0.2 | 0.2 |
| TSAN | 0.58 | 0.58 |
| EVA | 0.54 | 0.54 |
| PEPQ | 0.15 | 0.15 |
| 412S | 0.3 | 0.3 |
| MZP | 0.6 | — |
| ΔE (180° C., 13 days) | 3.9 | 15 |
| ΔE (180° C., 30 days) | 16 | 34 |

Table IV illustrates the importance of not including polyolefins in the formulation to obtain heat aged color stability. This result is particularly surprising as a known polyolefin stabilizer, PEPQ, is present in the blend.

TABLE IV

Weight Percent Composition of PBT Blends

| | Samples | | | | | | |
|---|---|---|---|---|---|---|---|
| Component | 6 | C | D | E | F | G | H |
| PBT | 55.25 | 54.25 | 53.25 | 54.25 | 53.25 | 54.25 | 53.25 |
| Glass Fiber | 30 | 30 | 30 | 30 | 30 | 30 | 30 |
| PBB-PA | 7.28 | 7.28 | 7.28 | 7.28 | 7.28 | 7.28 | 7.28 |
| AO | 3.12 | 3.12 | 3.12 | 3.12 | 3.12 | 3.12 | 3.12 |
| Zinc Sulfide | 3.0 | 3.0 | 3.0 | 3.0 | 3.0 | 3.0 | 3.0 |
| 412S | 0.30 | 0.30 | 0.30 | 0.30 | 0.30 | 0.30 | 0.30 |
| PEPQ | 0.15 | 0.15 | 0.15 | 0.15 | 0.15 | 0.15 | 0.15 |
| MZP | 0.20 | 0.20 | 0.20 | 0.20 | 0.20 | 0.20 | 0.20 |
| PETS | 0.20 | 0.20 | 0.20 | 0.20 | 0.20 | 0.20 | 0.20 |
| TSAN | 0.50 | 0.50 | 0.50 | 0.50 | 0.50 | 0.50 | 0.50 |
| EEA | — | 1.0 | 2.0 | — | — | — | — |
| EVA | — | — | — | 1.0 | 2.0 | — | — |
| PE | — | — | — | — | — | 1.0 | 2.0 |
| ΔE (180° C., 12 days) | 13 | 17 | 22 | 22 | 30 | 18 | 18 |
| ΔE (180° C., 33 days) | 26 | 37 | 41 | 38 | 43 | 37 | 40 |

What is claimed is:

1. A reinforced polyester molding composition having color stability at relatively high temperatures, comprises (a) from 40 to 97 weight percent of a polyester resin; (b) from about 3 to about 60 weight percent silica-based filler or reinforcement; (c) less than about 5 percent by weight additional ingredients which include a combination of stabilizers consisting essentially of an acidic quencher, a thioester and a phosphonite.

2. A polyester molding composition according to claim 1 wherein said polyester resin has repeating units of the following general formula:

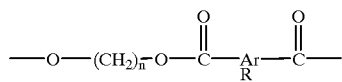

wherein n is an integer of from 2 to 6, Ar is a $C_6$–$C_{20}$ aryl radical comprising a decarboxylated residue derived from an aromatic dicarboxylic acid.

3. A polyester molding composition according to claim 1 wherein said polyester resin comprises poly(ethylene terephthalate) (PET), and poly(butylene terephthalate) (PBT), poly(ethylene naphthanoate) (PEN), poly(butylene naphthanoate), (PBN), poly(propylene terephthalate) (PPT), poly(cyclohexydimethylene terephthalate) (PCT) or a mixture of these resins.

4. A polyester molding composition according to claim 3 wherein the polyester resin comprises poly(1,4-butylene terephthalate) resin.

5. A polyester molding composition according to claim 1 wherein said polyester resin comprises a blend of polyester resins.

6. A polyester molding composition according to claim 5 wherein said blend comprises poly(ethylene terephthalate) and poly(1,4-butylene terephthalate).

7. A composition of claim 1 having a color shift of less than or equal to about fifteen delta E units after aging in air for twelve days, or less than or equal to about thirty delta E units after aging in air for thirty three days at 180° C.

8. A polyester molding composition according to claim 1 further comprising a flame retardant.

9. A composition of claim 8 having a color shift of less than or equal to about fifteen delta E units after aging in air for twelve days, or less than or equal to about thirty delta E units after aging in air for thirty three days at 180° C.

10. A composition of claim 8 where the flame retardant is a halogenated flame retardant.

11. A composition of claim 8 where the flame retardant is present at 2–30 wt. % of the total composition.

12. A polyester molding composition according to claim 10 wherein said flame retardant comprises a poly (pentabromobenzyl) acrylate or methacrylate.

13. A polyester molding composition according to claim 1 wherein said silica based filler (b) comprises glass fiber.

14. A composition of claim 10 having a color shift of less than or equal to about fifteen delta E units after aging in air for twelve days, or less than or equal to about thirty delta E units after aging in air for thirty three days at 180° C.

15. A polyester molding composition of claim 8 wherein the silica based filler (b) is fiber glass.

16. A polyester molding composition according to claim 1 wherein said stabilizers (c) are present a level of 0.01–2 weight percent.

17. A polyester molding composition according to claim 1 wherein said quenchers include acidic phosphate salts; an acid, alkyl, aryl or mixed phosphite having at least one hydrogen or alkyl group; a Group IB or Group IIB metal phosphate salt; a phosphorus oxo acid, a metal acid pyrophosphate or a mixture thereof.

18. A composition of claim 10 further compromising an antimony synergist.

19. A composition of claim 18 where the acidic quencher (c) consists of an acidic phosphate salt, a metal acid pyrophosphate, a phosphoric acid, an acidic organo phosphate or zinc phosphate.

20. A polyester molding composition according to claim 1 wherein said thioester stabilizer is the type having a sulfur linkage and an ester or carboxylic acid linkage separated by an divalent alkyl group.

21. A polyester molding composition according to claim 20 wherein said thioester stabilizer has the formula

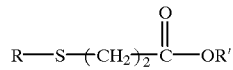

wherein R is alkyl and R' is alkyl or hydrogen.

22. A polyester molding composition according to claim 20 wherein said thioester stabilizer has the formula

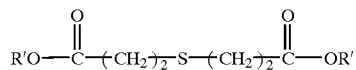

wherein R' is as above, either same or different, and with R' preferably being $C_{12}$–$C_{18}$ alkyl.

23. A polyester molding composition according to claim 20 wherein said thioester stabilizer has the formula

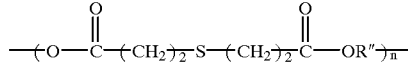

wherein R" is $C_2$–$C_{10}$ diol residue or a polyethylene glycol, polypropylene glycol or polybutylene glycol residue, and n is from 1 to 10.

24. A polyester molding composition according to claim 20 wherein said thioester stabilizer has the formula

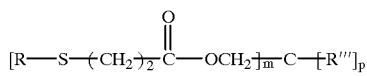

with R being alkyl and R''' being alkyl, alkoxy or carboalkoxy, with m+p=4.

25. A flame retarded reinforced polyester molding composition according to claim 1 wherein said phosphonite containing stabilizer comprises

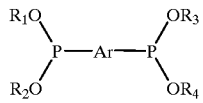

wherein $R_1$, $R_2$, $R_3$, $R_4$ are independently an alkyl, aryl, alkylaryl, alkyl substituted radical.

26. A flame retarded reinforced polyester molding composition according to claim 25 wherein said phosphonite is tetrakis(2,4-di-tert-butylphenyl)4,4'-biphenylene diphosphonite.

27. A flame retarded reinforced polyester molding composition according to claim 8 wherein said phosphonite is represented by the formula:

where $R_1$, R2 is an aryl radical of 6 to 30 carbon atoms, alkyl of 1 to 30 carbon atoms, or akyl substituted aryl.

28. A flame retarded reinforced polyester molding composition according to claim 1 comprising a portion of a clothing iron.

* * * * *